United States Patent
Cox

[19]

[11] Patent Number: 6,010,097
[45] Date of Patent: Jan. 4, 2000

[54] SCISSOR LINKAGE TYPE SLOTTED FLAP MECHANISM

[75] Inventor: Kenneth Ray Cox, Arlington, Tex.

[73] Assignee: Northrop Grumman Corporation, Los Angeles, Calif.

[21] Appl. No.: 08/951,608

[22] Filed: Oct. 16, 1997

[51] Int. Cl.⁷ ....................................................... B64C 9/16
[52] U.S. Cl. ........................................ 244/216; 244/75 R
[58] Field of Search ................................... 244/213, 214, 244/215, 216, 75 R

[56] References Cited

U.S. PATENT DOCUMENTS

| | | | |
|---|---|---|---|
| 2,158,676 | 5/1939 | Engelhardt | 244/216 |
| 2,218,114 | 10/1940 | Kunze | 244/216 |
| 2,405,728 | 8/1946 | Zap | 244/216 |

FOREIGN PATENT DOCUMENTS

| | | | |
|---|---|---|---|
| 858073 | 11/1940 | France | 244/216 |
| 668363 | 10/1935 | Germany | 244/216 |
| 504336 | 4/1939 | United Kingdom | 244/216 |

*Primary Examiner*—Galen I. Barefoot
*Attorney, Agent, or Firm*—Terry J. Anderson; Karl J. Hoch, Jr.

[57] ABSTRACT

A wing flap structure includes a wing, a flap, and a hinge mechanism connecting the wing and the flap. The hinge mechanism includes first and second hinge links connected between the wing and the flap. The pivot points for the hinge links are oriented so that as the flap moves away from the wing, the flap moves in a circular arc path relative to the wing. The first hinge link includes a first elongate link having a first end rotatably connected to the wing. The second hinge link includes a second elongate link having a first end rotatably connected to the second end of the first link, and having a second end rotatably connected to the flap. The rotatable connections have axes of rotation that meet at a point below the wing to define an axis of rotation for the circular arc of the flap. The hinge mechanism is contained substantially along the circular arc of the flap as the flap is extended and retracted. A drive mechanism is connected to the wing and to the flap for moving the flap through a circular arc. The drive mechanism is also contained substantially along the circular arc path of the flap. The drive mechanism is powered by a linear actuator. The drive mechanism controls the pivot points of the hinge to ensure that the flap follows a circular arc as it extends, and provides lateral stability for the structure.

10 Claims, 9 Drawing Sheets

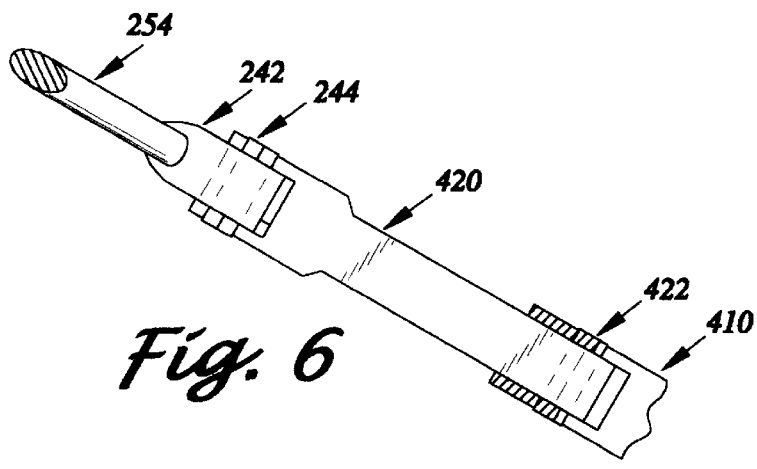
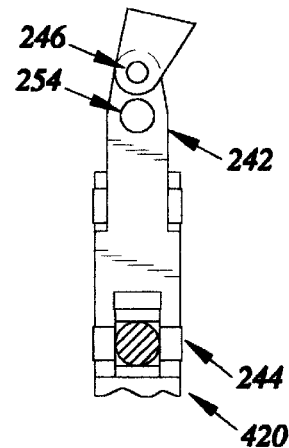
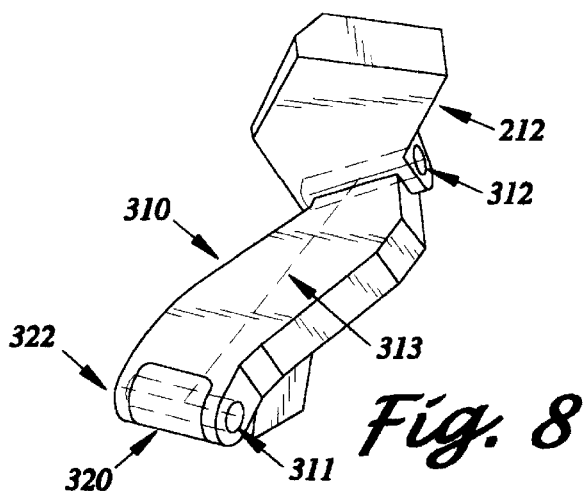
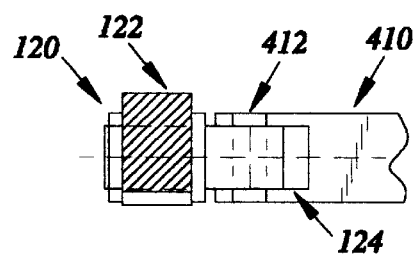

SCISSOR LINKAGE TYPE SLOTTED FLAP MECHANISM

BACKGROUND OF THE INVENTION

The present invention relates to the mechanism for extending an aerodynamic flap from the trailing edge of a wing, such as on an aircraft. Specifically, the invention relates to a mechanism for extending a slotted type flap in which the mechanism can be housed substantially or entirely within the wing.

Flap mechanisms have been used on the trailing edge of aircraft wings for many years. In a slotted flap, the flap is extended in a downward and aft rotary motion from the trailing edge of the wing. The extended flap provides increased lift for landing and take off. The downward and aft motion of the flap provides an opening between the wing and the flap when the flap is deployed, so that air from the bottom of the wing can be routed to the top of the flap to improve lift.

Many of the existing mechanisms for deploying the flap incorporate substantial mechanisms that extend below the wing surface. For various reasons it would be beneficial to have a flap extension structure that could fit entirely within the wing. Such a structure would improve the aerodynamics of the wing, and would also reduce the observability of the structure to radar by reducing or eliminating surface discontinuities or obstructions.

SUMMARY OF THE INVENTION

The present invention is a wing flap structure that includes a wing, a flap, and a hinge mechanism connecting the wing and the flap. The hinge mechanism includes first and second hinge links connected between the wing and the flap. The pivot points for the hinge links are oriented so that as the flap moves away from the wing, the flap moves in a circular arc path relative to the wing. The first hinge link is an elongate link having a first end rotatably connected to the wing. The second hinge link is an elongate link having a first end rotatably connected to the second end of the first link, and having a second end rotatably connected to the flap. The rotatable connections have axes of rotation that meet at a point below the wing to define an axis of rotation for the arc of the flap. The hinge mechanism is contained substantially along the arc of the flap as the flap is extended and retracted. A drive mechanism is connected to the wing and to the flap for moving the flap through an arc. The drive mechanism is also contained substantially along the arc of the flap. The drive mechanism is powered by a linear actuator. The drive mechanism controls the pivot points of the hinge to ensure that the flap follows an arc as it extends and provides lateral stability to the hinge structure.

It is an object of the invention to provide a linkage for a trailing edge flap that can be contained within the wing.

It is an object of the invention to provide a linkage for a trailing edge flap that does not protrude significantly from the wing surface.

It is an object of the invention to provide a wing flap that rotates about a virtual hinge line.

It is an object of the invention to provide a wing flap extension linkage that moves substantially within the path of the wing flap.

It is an object of the invention to provide a linkage for a trailing edge flap that extends the flap in a downward and aft rotation.

It is an object of the invention to provide a path for air from the bottom of the wing to the top of the flap.

It is a further object of the invention to provide a path for air from the bottom of the wing to the top of the wing that can be controlled.

BRIEF DESCRIPTION OF THE DRAWING

FIG. 6 is a view, partially in cross section, taken along line 6—6 of FIG. 5.

FIG. 7 is a view, partially in cross section, taken along line 7—7 of FIG. 5.

FIG. 8 is a view taken along line 8—8 of FIG. 5.

FIG. 9 is a view of a portion of the attachment of the drive mechanism to the flap, taken along line 9—9 of FIG. 5.

DETAILED DESCRIPTION OF THE PREFERRED EMBODIMENT

Figure 1:
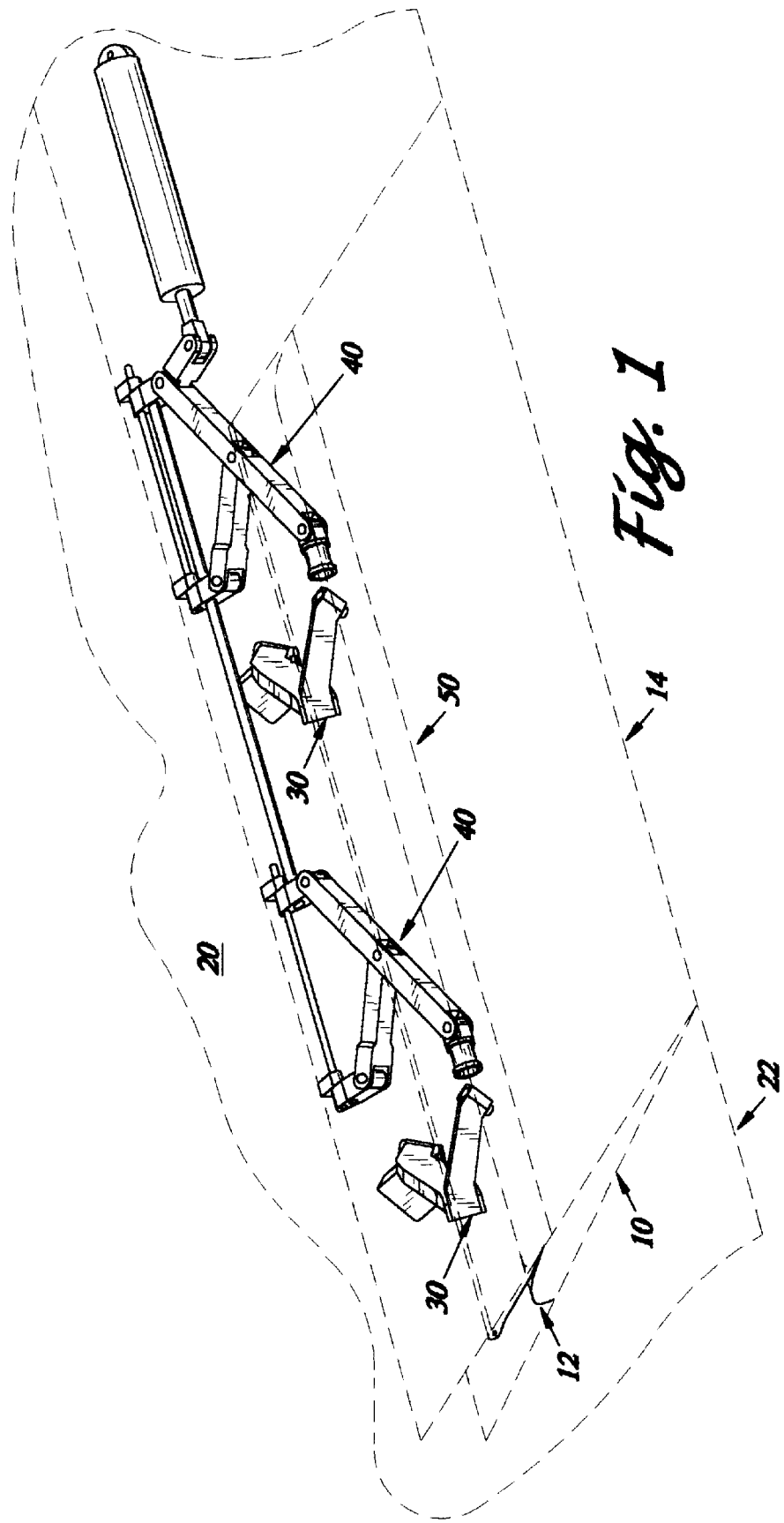
FIG. 1 is a perspective view of a flap mechanism incorporating the invention, in the flap up position, showing the exterior of the wing and flap in phantom.

A flap structure attached to a wing and incorporating the present invention is shown in FIG. 1. The flap 10 is attached to the wing 20 by a pair of hinges 30 and a pair of drive links 40. Each drive link 40 is paired with a hinge 30. The flap has a leading edge 12 and a trailing edge 14. The wing has a trailing edge 22. The flap 10 is adjacent to the trailing edge 22 of the wing 20. The leading edge 12 of the flap is nearer to the main wing structure. An actuated shroud 50 covers the gap between the wing and the flap as the flap is extended.

Figure 3:
FIG. 3 is an end view of a flap mechanism incorporating the invention, in the flap up position, showing the exterior of the wing and flap in phantom.

FIG. 1 shows the structure in the "flap up" position. A side view of the flap in the flap up position is shown in FIG. 3.

Figure 2:
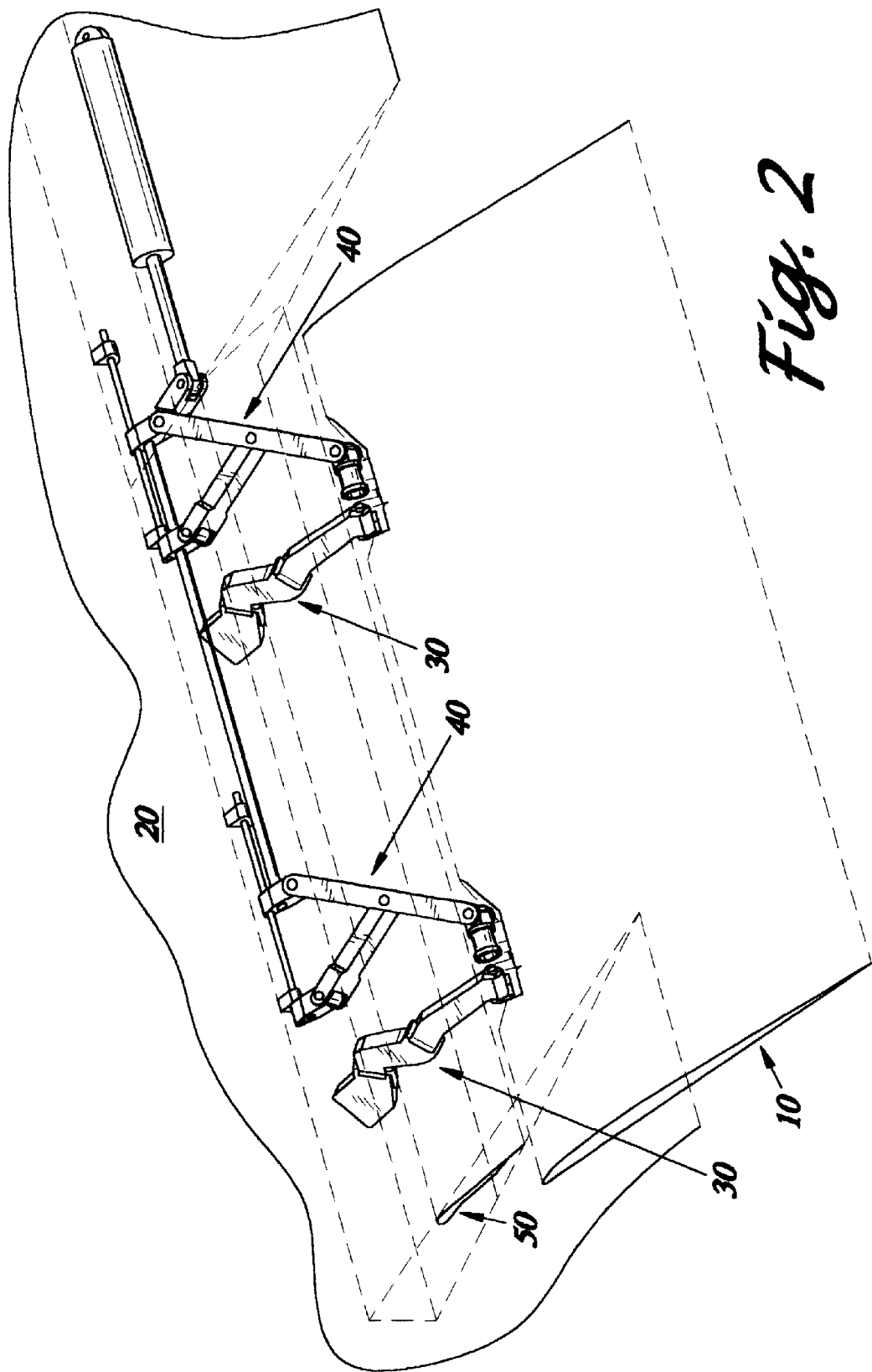
FIG. 2 is a perspective view of the flap mechanism incorporating the invention, in the flap down position, showing the exterior of the wing and flap in phantom.
Figure 4A:
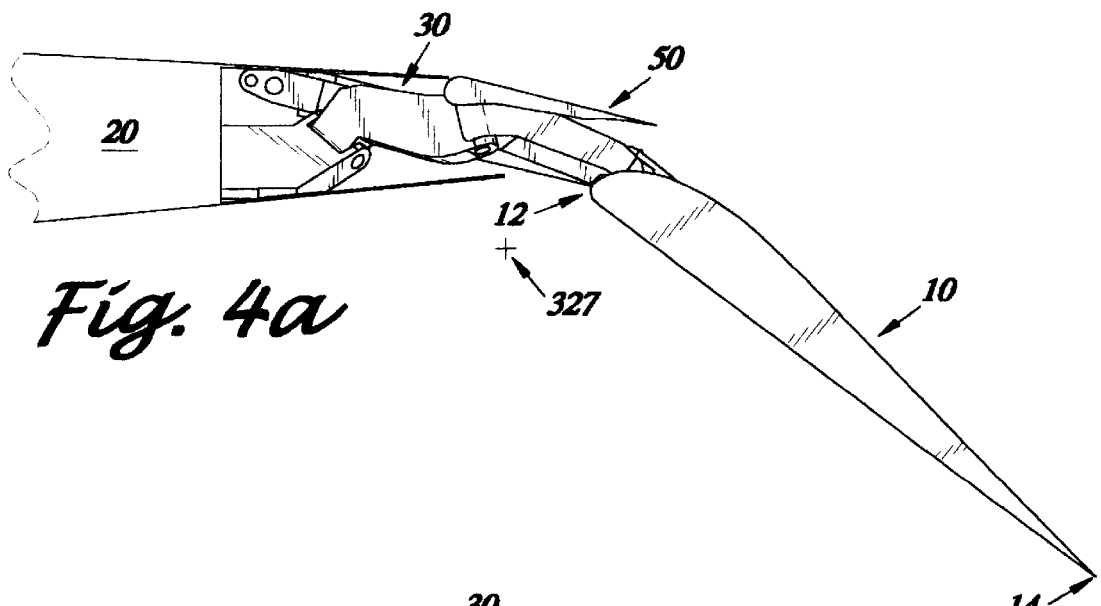
FIG. 4a is an end view of a flap structure incorporating the invention, in an intermediate, partially extended position.
Figure 4B:
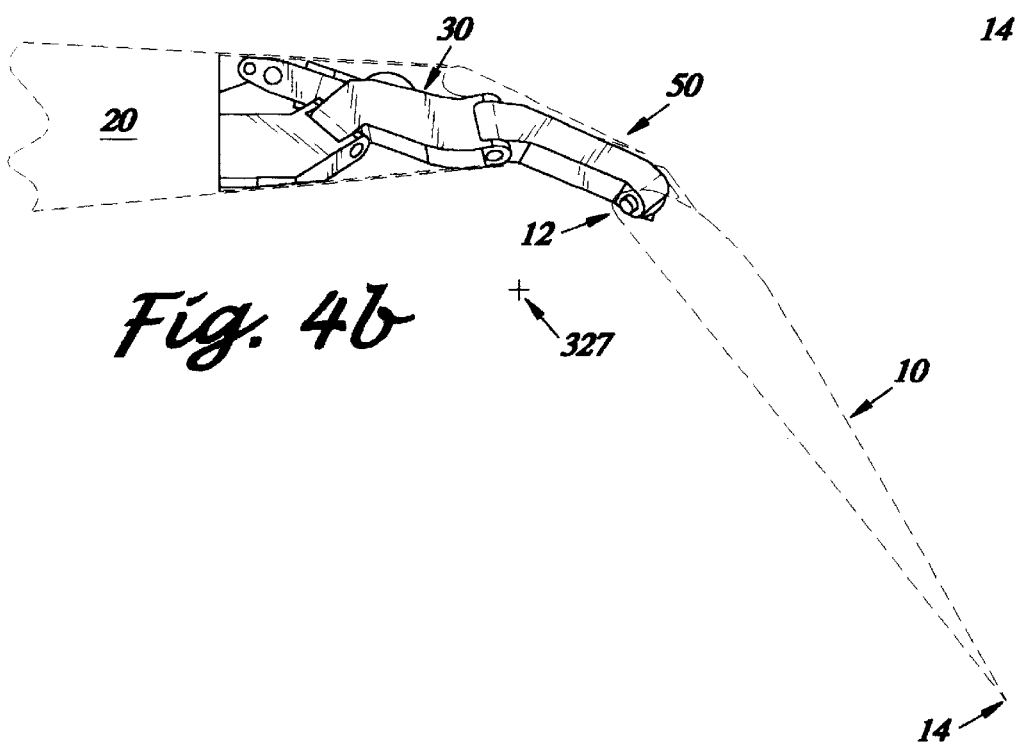
FIG. 4b is an end view of a flap structure incorporating the invention, in the extended, flap down position.

FIG. 2 shows the flap in the down position, with the drive links 40 and the hinges 30 extended. A side view of the flap in an intermediate, partially extended, position between "flap up" and "flap down" is shown in FIG. 4a. A side view of the flap in the fully extended, flap down position is shown in FIG. 4b.

Hinge Structure

Figure 5:
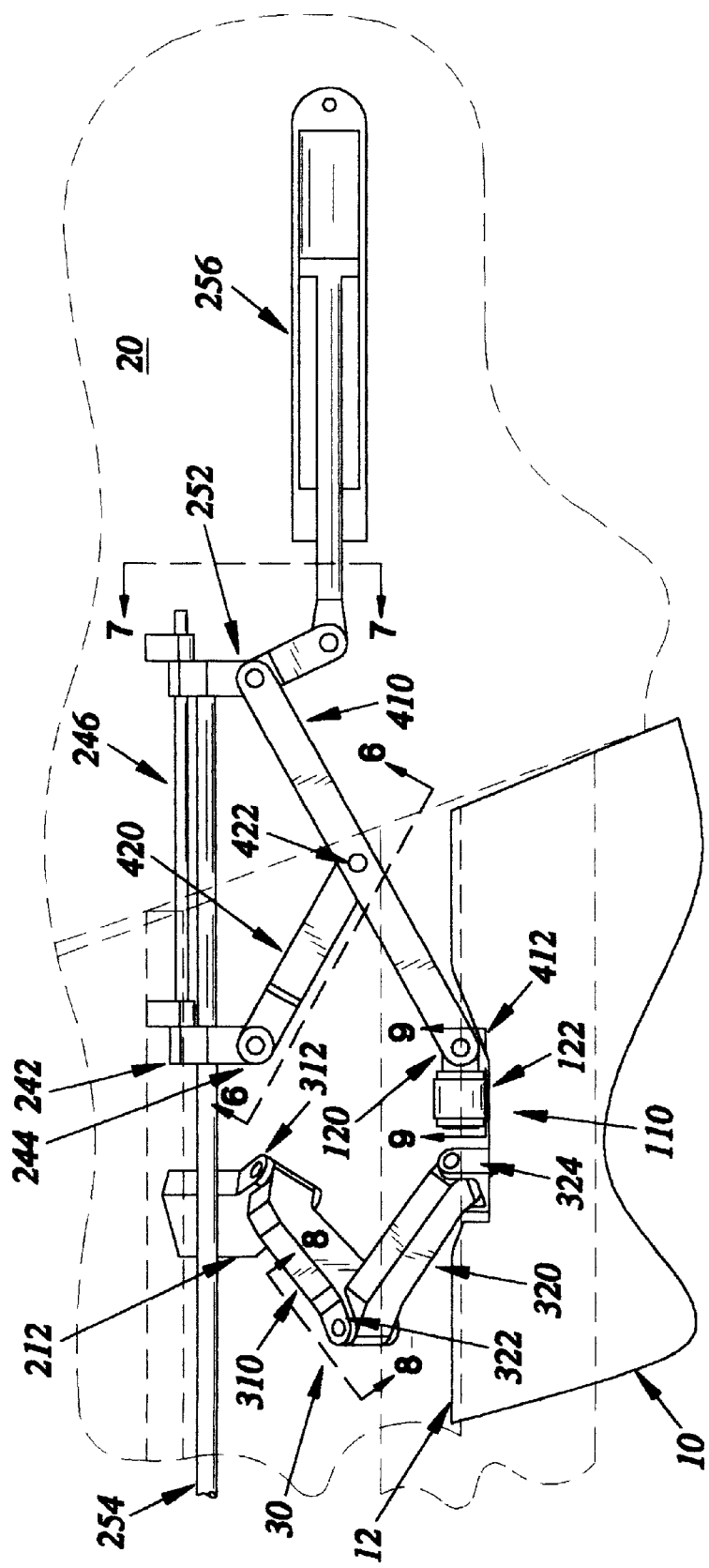
FIG. 5 is a top view of the wing flap mechanism incorporating the invention.

Referring now to FIG. 5, the hinge 30 and drive link 40 are shown in greater detail. Each hinge 30 includes a pair of scissors links 310, 320. The forward link 310 is attached to the wing 20 at a pivot point 312. The pivot point 312 may be attached to the wing structure by a fixed attachment 212. The attachment 212 may be attached to the wing 20 by attaching it to a wing spar.

The forward link 310 of the hinge is an elongate member with its first end rotatably attached to the wing structure at the pivot point 312. The forward link 310 also has a second end. The aft link 320 has a first end that is rotatably attached to the second end of the forward link 310 at the pivot point 322. Thus, the pivot point 322 provides pivoting between the forward link 310 and the aft link 320. The second end of the aft link 320 is rotatably attached at a pivot point 324 to the flap 10. In the particular embodiment shown, the pivot point 324 is on a structural attachment 110 that is securely affixed to the flap 10. The links 310, 320 may be different lengths. For example, the forward link 310 may be 6.65 inches in length, and the aft link 320 may be 7.26 inches in length.

The pivot point 322 between the forward link 310 and the aft link 320 is shown in greater detail in FIG. 8. The end of the forward link 310 has an enlarged fork with a pivot pin 311 that is oriented at an angle relative to the axis 313 of the forward link 310. The end of the aft link 320 then can pivot about the pin 311. The pivot pin 311 provides the rotation axis for the pivot point 322 between the forward link 310 and the aft link 320.

Figure 10:
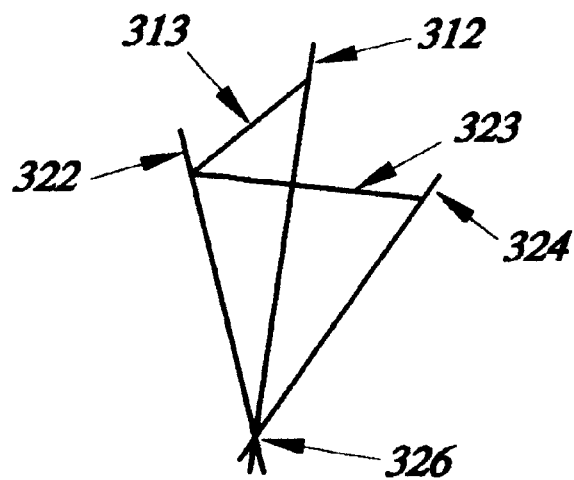
FIG. 10 is a representation of the axes of rotation of the pivot points of the hinge connecting the flap to the wing.
Figure 11:
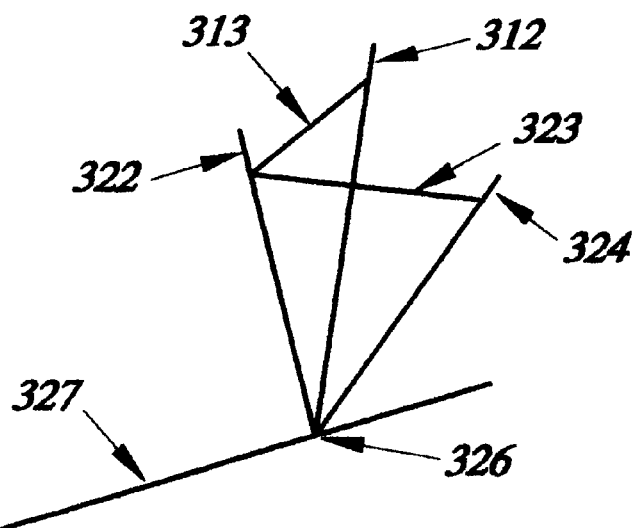
FIG. 11 is a representation of a portion of the relationship among the pivot points of the hinge connecting the flap to wing.

The axes of rotation of the pivot points 312, 322, 324 are not parallel. They are angled so that they intersect beneath the flap. FIG. 10 shows the axes of rotation of the pivot points or joints 312, 322, 324, and how they meet at a point 326. The axis 313 of the forward link 310 and the axis 323 of the aft link 320 are also shown in FIG. 10. The points of intersection 326 for both hinges 30 lie on a virtual hinge line 327. The hinge line 327 becomes the axis of rotation for the flap as the hinge 30 extends the flap from the wing. This hinge line 327 is seen in FIGS. 3, 4a, and 4b (perpendicular to the view). The hinge line 327 is parallel to the leading edge 12 of the flap 10. The point 326 at which the axes of rotation of the pivot points 312, 322, 324 meet remains fixed on the hinge line 327 as the flap is extended and retracted. The hinge line 327 is the virtual hinge for the flap 10.

If the pivot point 324 on the flap is forced to move in a plane that is normal to the hinge line 327, and that plane contains the pivot point 312 on the wing, the pivot point 324 will always move in a true circular arc about the virtual hinge line 327. The pivot point 324 on the flap moves in an arc because the distance from the pivot point 324 to the pivot or intersection point 326 (the intersection of the axes of the pivot points) is always the same, the intersection point 326 is always in the same point (relative to the wing), and the pivot point 324 is forced to move in a plane. The means to force the pivot point 324 to move in a plane are described below. Thus, the pivot point 324 will move in an arc about the hinge line 327 as the flap 10 is extended and rotated.

The pivot points 312 and 324 will always be the same distance from the hinge line 327. However, the distance between the pivot point 322 and the hinge line 327 will vary.

It is important to control the distance of the hinge or pivot point 322 to the hinge line 327 as the flap rotates. If the pivot point 322 moves up too much, it will interfere with other parts of the flap structure. In particular, the hinge would be likely to interfere with the actuated shroud that controls or throttles air flowing below the wing to the top of the flap. If, however, it moves down too much, the links 310, 320 will interfere with the lower wing surfaces.

If the axis of rotation for the pivot point 322 (to the intersection point 326) is perpendicular to the hinge line 327, then the pivot point 322 moves very slowly toward the hinge as the pivot point 324 rotates toward or away from pivot point 312. By adjusting the angles of the pivot points 312, 322, 324, to adjust the point at which they meet, the motion of the hinge links may be controlled. Such control allows the hinge links to be largely within a circular path about the hinge line 327.

If an imaginary plane is considered that is normal to the hinge line 327 and contains the pivot points 312 and 324, then the point at which the axes of rotation of the pivot points 312, 322, 324 meet will be at a point 326 along the hinge line 327 that may be either near that imaginary plane, or farther away from it. If the point 326 is near the plane, then the pivot point 322 will move rapidly as the flap 10 rotates. If a second plane is imagined containing pivot point 322, that plane is normal to the hinge line 327, and the point 326 at which the axes of rotation meet is near that second imaginary plane, then the pivot point 322 will move slowly as the flap rotates.

Thus, the hinge mechanism 30 causes the link 310, the link 320, and their pivot point 322 to move in an essentially circular arc about the axis 327 as the edge 12 moves rearward with respect to the wing 20. The axis 327 is parallel to and below the leading edge 12 of the flap. The flap is moved away from the wing by a drive structure 40.

The angles of the axes of rotation 312, 322, 324 will vary by application. They are largely dependent on the path desired for the flap. The pivot points will be oriented so that their axes of rotation meet a short distance below the wing if the flap is to rotate sharply as it is extended. If, however, the flap is to move in a shallow arc, the pivot points will be oriented so that the intersection of their axes of rotation is substantially farther below the wing.

Figure 15:
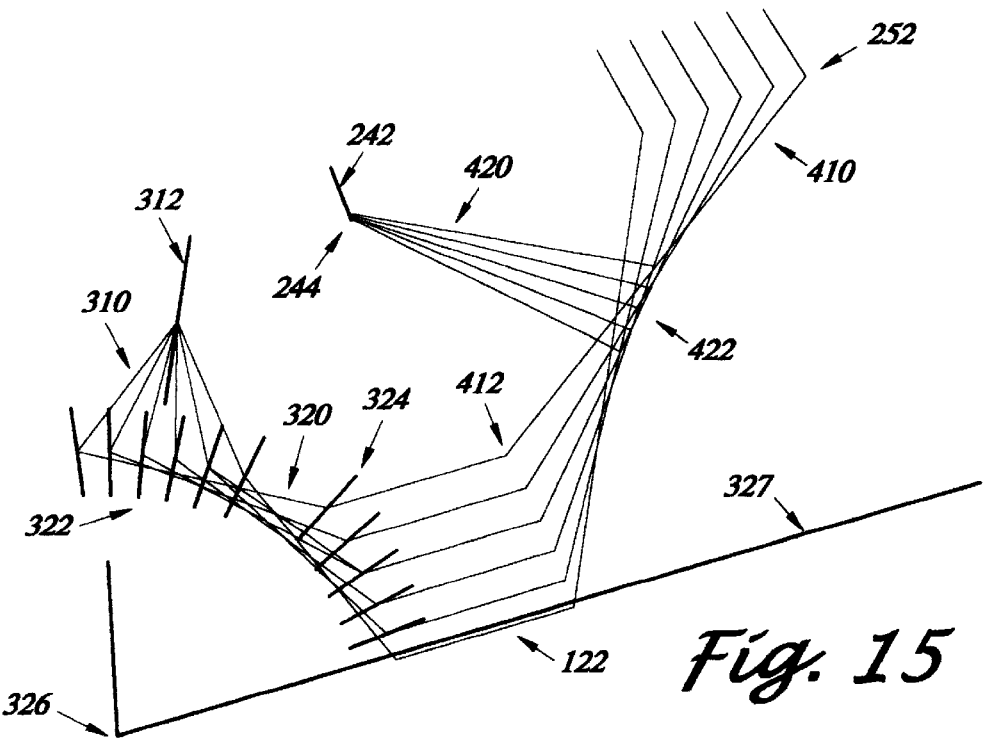
FIG. 15 is an isometric view of the centerlines of the links and pivot points of the hinge and drive mechanism incorporating the invention, as the flap is extended.

An isometric view of a family of linkage centerlines is shown in FIG. 15. Each rotation axis and link axis is shown as a series of lines. Each line represents the position and orientation of the axis as the hinge structure is unfolded.

The axis of the pivot point 312 remains fixed as the hinge is unfolded, as the attachment 212 is fixed to the wing 20. One end of the forward linkage 310 is pivotally attached to the attachment 212 at the pivot point 312, so that the axis of the forward link 310 pivots about the pivot point 312. This is shown in FIG. 15 as a series of axes labeled 310.

The pivot point 322 between the forward link 310 and the rear link 320 is shown in FIG. 15 as moving as the link 310 rotates about the pivot point 312. The geometry of the axes causes the pivot axis 322 to simultaneously translate and turn.

The axis of the rear or aft link 320 is shown as the pivot point 322 translates and turns. The rotation axis of the pivot point 324 also translates and turns. As can be seen from FIG. 15, the axes of rotation of the pivot points 322 and 324 meet at a single point 326 along the virtual hinge line 327.

Figure 16:
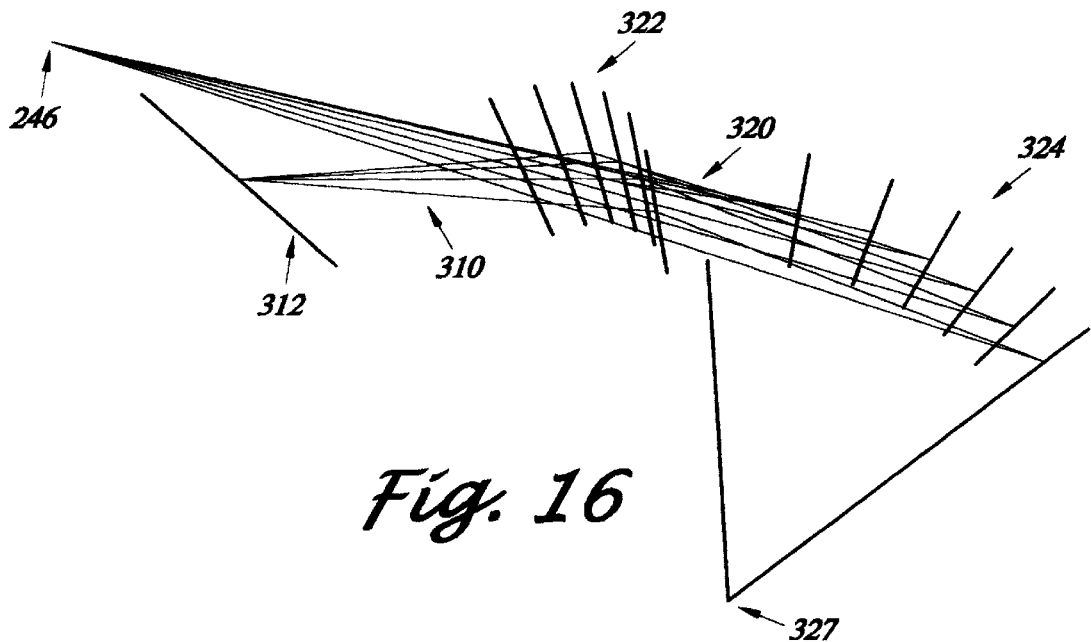
FIG. 16 is a view along the virtual hinge line of the centerlines of the links and pivot points of the hinge incorporating the invention, as the flap is extended

An additional view of the linkage axes or centerlines as the flap is extended is shown in FIG. 16. The view of FIG. 16 is normal to the virtual hinge line 327.

Referring now to FIG. 16, the axis of rotation of the pivot point 312 is shown as a single line, as the pivot point 312 is fixed to the wing structure. The axis of the forward link 310 is shown as the flap is extended from the wing as a series of lines connecting the pivot point 312 and the pivot point 322. The pivot point 322 is itself shown as a series of lines indicating its position and orientation as the flap is extended. Note that the axis of the pivot point 322 intersects the virtual hinge line 327 throughout the range of movement of the hinge structure.

The axis of the rear hinge link 320 as it moves through its range of movement is shown in FIG. 16 as a series of lines connecting the pivot point 322 and the flap pivot point 324. The axis of the flap pivot point 324 itself is shown as a series of lines indicating its position and orientation as the flap is extended. Note that the axis of the flap pivot point 324 also intersects the virtual hinge line 327 throughout the range of movement of the hinge structure.

Drive Linkage

The drive linkage 40 causes the flap 10 to be moved away from and toward the wing 20, and provides lateral stability to the hinge structure. The drive linkage 40 maintains a particular desired predetermined relationship among the pivot points 312, 322, 324 of the hinge links 310, 320. The drive linkage geometry constrains the movement of the pivot point 324 at which the second hinge link 320 is joined to the flap 10. The drive linkage geometry causes the pivot point 324 to move in a plane normal to the flap hinge line 327.

Referring to FIG. 5, the drive linkage 40 includes a long link 410 and a short link 420. The long link 410 is twice the length of the short link. One end of the short link 420 connects at the middle or mid-point of the long link 410. The long link 410 may be 17.16 inches in length, and the short link may by 8.58 inches in length.

The long link 410 is an elongate member that has a first end connected to a swivel 120 that is rotatably attached to the flap 10. The swivel 120 is shown in greater detail in FIG. 9. The link 410 is rotatably attached to the swivel at the pivot point 412. The pivot point 412 has an axis of rotation perpendicular to the axis of the link 410, and perpendicular to the swivel axis 122. The swivel head 124 to which the link 410 is attached rotates about the axis of the swivel shaft 122. The distance from the pivot point 324 for the aft hinge link to the pivot point 412 on the swivel for the long link 410 (see FIG. 5) may be 5.5 inches.

The end of the short link 420 is attached to the long link 410, preferably at the mid-point of the long link 410. The rotatable attachment between the short link 420 and the long link 410 pivots on a pivot point 422. This connection is shown in greater detail in FIG. 6.

The second end of the short link 420 is attached to a hinge fitting 242 about a pivot point 244. The pivot point 244 permits the short link 420 to pivot about an axis of rotation perpendicular to the axis of the link 420.

The hinge fitting 242 is rotatably attached to the wing structure 20. The hinge fitting is shown in greater detail in FIG. 6. The hinge fitting 242 pivots on a pivot shaft 246 with respect to the wing structure 20 (see FIG. 5). The axis of rotation of the pivot shaft 246 is parallel to the axis of rotation or virtual hinge line 327 of the flap.

Referring again to FIG. 5, the second end of the long link 410 is attached to a universal fitting 252. The universal fitting 252 is attached to the actuator link 254. The actuator link 254 is driven by an actuator 256, which may be a piston type linear actuator. As the actuator 256 pushes the actuator link 254, the universal link 252 is drawn toward the hinge fitting 242, thus drawing the end of the long link 410 toward the end of the short link 420. As this occurs, the pivot point 412 at the other end of the long link 410 moves away from the wing. That movement drives the flap 10 about the hinge line 327. This geometry of the drive linkage provides the means to force the pivot point 324 to move in a plane normal to the flap hinge line 327.

As the universal joint 252 moves with the actuator link 254, the universal 252 slides along a pivot shaft 246 that is attached to the wing 20. The actuator link 254 passes through an opening through the hinge fitting 242 (see FIG. 6). The actuator link 254 may be 39.5 inches from universal joint 252 on linkage 40 to the corresponding universal on the next linkage 40. The pivot shaft 246 may be 19.5 inches in length.

The isometric view of FIG. 15 also shows the centerlines of the linkages of the drive mechanism 40. A series of parallel lines 122 represent the position of the axis of the swivel shaft. Another series of lines 410 represent the axis of the long link 410 as it moves in its range. Similarly, a series of lines 420 represent the axis of the short link 420. The universal joint 252 is shown as a series of parallel lines as it moves along its path along the pivot shaft 246 (see FIG. 5). As noted above, the long link 410 rotates about a pivot point on the universal 252.

The hinge fitting 242 is shown as a single line. The hinge fitting is rotatably attached to the wing 20 by pivot shaft 246. Its pivot point 244 is shown as the intersection of the hinge fitting 242 and the short link 420, represented by its longitudinal axis. The short link 420, rotates about that rotation axis 244.

The pivot points 412, 422, and 252 are shown connecting the links 410, 420. However, the axes of rotation for the pivot points 412, 422, and 252 are not shown in FIG. 15. A series of lines 410 show the relative position of the axis of the long link 410 as the drive structure 40 moves through its range of positions. The axis of the long link 410 is shown connected to the axis 422 of the swivel at the pivot point 412.

The long link 410 and the short link 420 meet at the pivot point 422. The pivot point 422 is shown in FIG. 15 as a series of intersections of the long link 410 and the short link 420.

The downward and aft rotation of the flap provides an opening between the wing 20 and the leading edge 12 of the flap 10 when the flap is deployed (in the "down" position). Air from the bottom of the wing may then be routed through that opening to the top of the flap, to improve lift. See FIG. 13.

Figure 12:
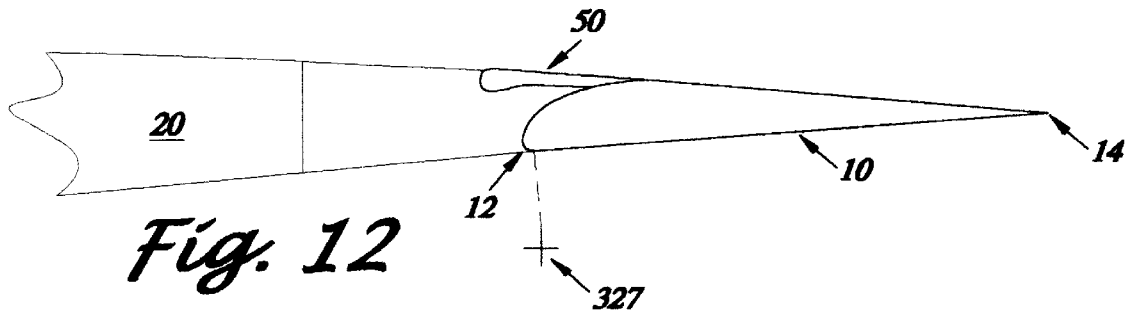
FIG. 12 is a view taken normal to the hinge line of the flap, showing the relationship between the wing, the stowed shroud, and the retracted flap.
Figure 13:
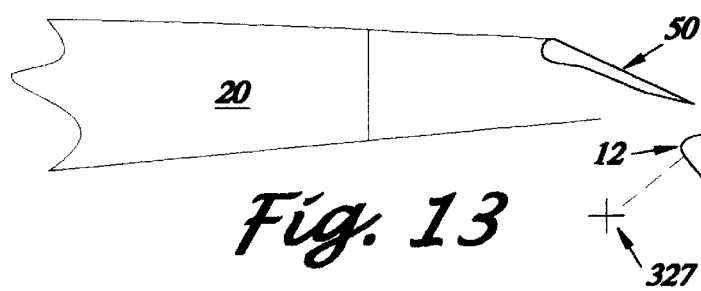
FIG. 13 is a view taken normal to the hinge line of the flap, showing the relationship between the wing, the extended shroud, and the extended flap.

An actuated shroud 50 may be attached at its forward edge to the wing 20 to cover the gap between the wing and the flap. FIG. 12 shows the wing with the actuated shroud 50 and flap 10 in the stowed or normal flight position. The actuated shroud 50 may be rotated down during motion of the flap 10 to form a nozzle that controls the amount of air that is extracted from under the wing and blown over the top of the flap, as shown in FIG. 13. The flap 10 and shroud 50 are moved downward so that air from the bottom of the wing has a clear straight uninterrupted path to the nozzle formed by them.

Figure 14:
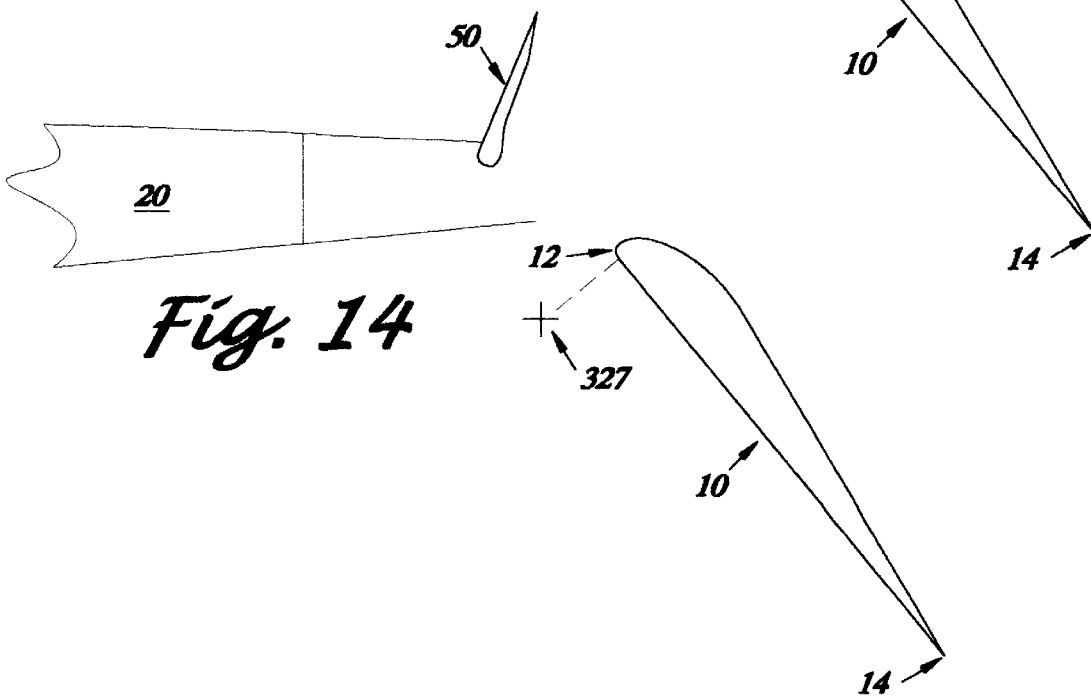
FIG. 14 is a view taken normal to the hinge line of the flap, showing the relationship between the wing, the raised shroud used as a spoiler, and the extended flap.

The actuated shroud 50 may also be used to spoil lift or be used as a spoiler. The spoiler or actuated shroud may be rotated up—to quickly kill wing lift during a landing with the flaps down, as shown in FIG. 14. The actuated shroud or spoiler is actuated by an independent conventional actuation system (not shown).

While a preferred embodiment of the invention has been described herein, it will be appreciated that a number of modifications and variations will suggest themselves to those skilled in the pertinent arts. These variations and modifications that may suggest themselves should be considered within the spirit and scope of the present invention as defined in the claims that follow.

What is claimed is:

1. A wing flap structure, comprising:
   a wing having a leading edge and a trailing edge;
   a flap having a leading edge and a trailing edge; and
   a flap extension mechanism attached to and extending between the wing and the flap for selectively moving the flap between retracted and extended positions relative to the wing in a generally arcuate path about a hinge axis;
   the flap extension mechanism being sized and configured to generally follow the arcuate path as the flap is moved between the retracted and extended positions, and to substantially extend along the arcuate path when the flap assumes the extended position.

2. The wing flap structure of claim 1 wherein the flap extension mechanism comprises:
   a hinge mechanism which couples the flap to the wing and comprises:
      a first hinge link having first and second ends, the first end of the first hinge link being rotatably connected to the wing at a first pivot point which defines a first pivot axis; and
      a second hinge link having a first end which is rotatably connected to the second end of the first hinge link at a second pivot point which defines a second pivot axis, and a second end which is rotatably connected to the flap at a third pivot point which defines a third pivot axis;
      the hinge mechanism being configured such that the first, second and third pivot axes intersect at a point on the hinge axis;
   a drive linkage which couples the flap to the wing and is operative to selectively move the flap between the retracted and extended positions, the drive linkage being sized and configured to provide lateral stability to the hinge mechanism, to maintain prescribed relationships between the first, second and third pivot points during movement of the flap between the retracted and extended positions, and to control the positioning of the third pivot point during movement of the flap between the retracted and extended positions.

3. The wing flap structure of claim 2 wherein the hinge axis extends below the flap.

4. The wing flap structure of claim 3 wherein the hinge axis extends in generally parallel relation to the leading edge of the flap.

5. The wing flap structure of claim 2 wherein the hinge mechanism and the drive linkage each extend between the trailing edge of the wing and the leading edge of the flap.

6. The wing flap structure of claim 2 wherein the drive linkage is sized and configured to constrain the movement of the third pivot point to within a plane that extends radially relative to the hinge axis during movement of the flap between the retracted and extended positions.

7. The wing flap structure of claim 6 wherein the drive linkage is rotatably connected to the flap and the wing so as to be rotatable relative to the wing when the flap moves between the retracted and extended positions.

8. The wing flap structure of claim 7 wherein the drive linkage comprises:
   a long drive link having a first end which is mechanically coupled to the flap and rotatable about at least two axes relative thereto, and a second end which is mechanically coupled to the wing and rotatable about at least two axes relative thereto;
   a short drive link having a first end rotatably connected to the long drive link and a second end rotatably connected to the wing; and
   a linear actuator attached to the wing and mechanically coupled to the second end of the long drive link for selectively moving the second end of the long drive link in a generally linear direction which is substantially parallel to the leading edge of the flap.

9. The wing flap structure of claim 8 wherein one of the axes of rotation of the second end of the long drive link relative to the wing is generally parallel to the leading edge of the flap, with the other axis of rotation of the second end of the long drive link relative to the wing being substantially perpendicular to the long drive link.

10. The wing flap structure of claim 9 wherein the drive linkage further comprises a joint which facilitates the mechanical coupling of the second end of the long drive link to the linear actuator and is movable in the linear direction by the linear actuator.

* * * * *